June 3, 1969          E. L. PARR          3,447,639

ONE-WAY ROLLER BARRIER FOR PARKING LOT

Filed July 20, 1967

INVENTOR.
EDWARD L. PARR

BY

ATTORNEYS

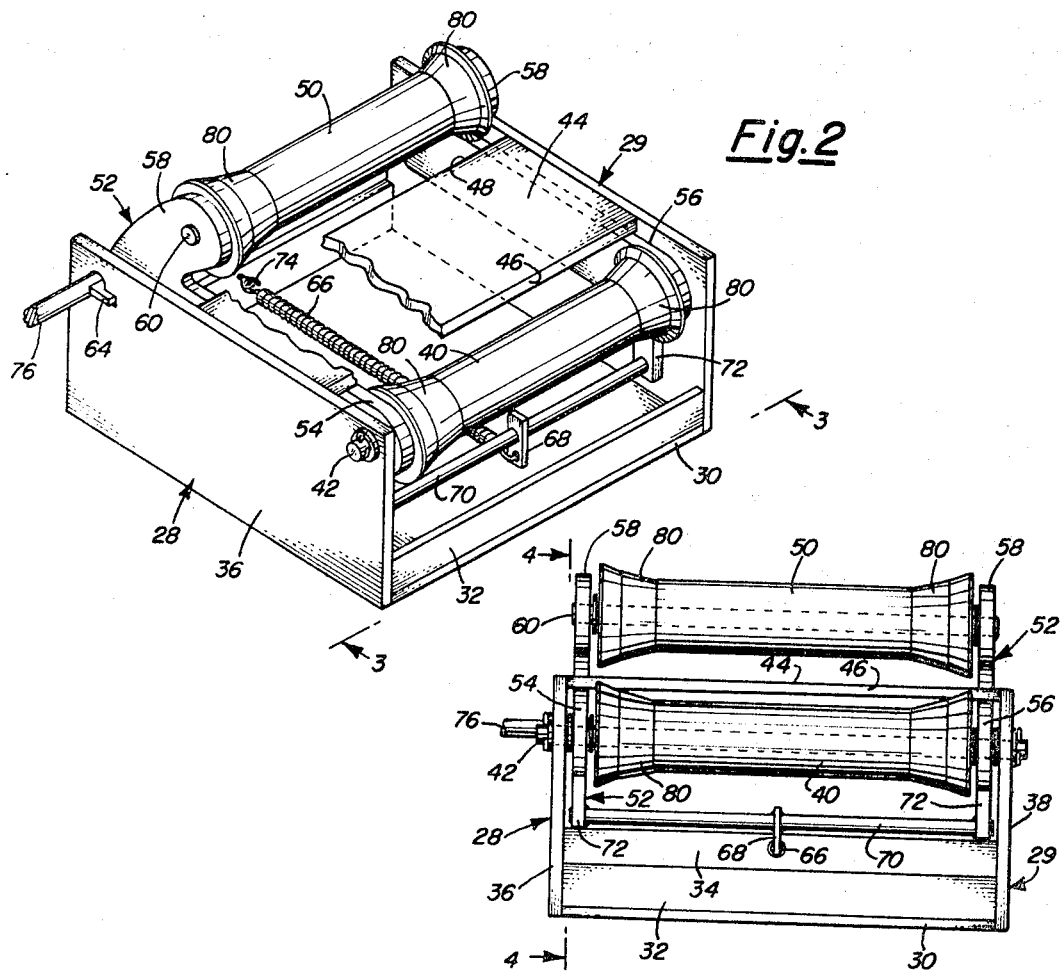
Fig.2
Fig.3
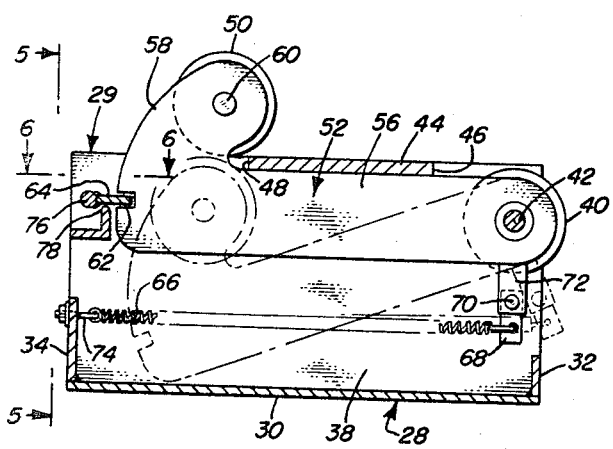
Fig.4
INVENTOR.
EDWARD L. PARR
BY
ATTORNEYS

United States Patent Office 3,447,639
Patented June 3, 1969

3,447,639
ONE-WAY ROLLER BARRIER FOR PARKING LOT
Edward L. Parr, El Cajon, Calif., assignor to
Wendell L. Thompson, Burbank, Calif.
Filed July 20, 1967, Ser. No. 654,826
Int. Cl. B60t 3/00
U.S. Cl. 188—32                                6 Claims

ABSTRACT OF THE DISCLOSURE

A roller barrier apparatus, in which roller mechanism lies in the normal path of movement of a vehicle traction wheel, which roller mechanism can be locked in its upper barrier position, but which when not locked is ineffective as a barrier.

---

The barrier of the present invention includes rotatable mechanism of any desirable type, herein for illustrative purpose, comprises a roller. This rotatable mechanism lies in the normal path of movement of the traction wheel of a vehicle, such as the tire of an automobile. This rotatable mechanism is mounted for vertical movement and can be locked in an upper position. When in the upper position, it functions as a barrier. A platform lies forwardly of the rotatable mechanism. As the traction wheel on the platform attempts to pass over the rotatable mechanism, it is lifted off the platform to such extent that sufficient traction is had between the wheel and the platform. The rotatable mechanism can be unlocked whereby it can be lowered to a position in which it is ineffective as a barrier.

Other features and the advantages of the present invention will be apparent from the following description, reference being had to the accompanying drawings wherein a preferred embodiment of the invention is illustrated.

In the drawings:

FIG. 2 is a perspective view of the barrier shown in FIG. 1, but on a larger scale;

FIG. 3 is a front view of the barrier looking in the direction of arrows 3—3 of FIG. 2;

FIG. 4 is a sectional view taken along line 4—4 of FIG. 3;

Figure 1:
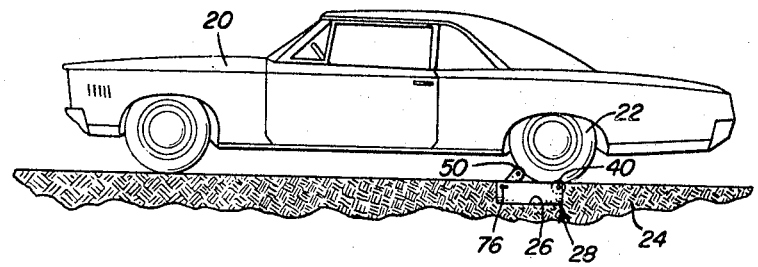
FIG. 1 is a side view of an automobile having a rear traction tire, it being on the barrier of this invention, the ground being shown in section.
Figure 5:
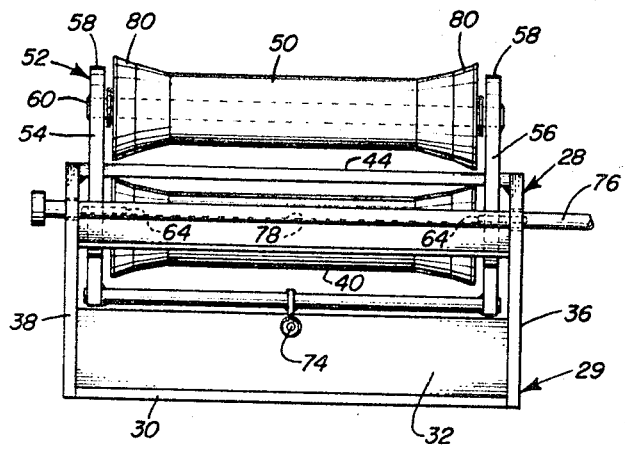
FIG. 5 is a rear view of the barrier, looking in the direction of arrows 5—5 of FIG. 6.

Referring more in detail to the drawings, the vehicle 20 shown in FIG. 1, is of the type which is driven by the rear wheels, one of which is shown at 22. The ground 24 is recessed as at 26 to receive a series of the barriers, one of which is shown at 28. One barrier is sufficient for controlling forward movement of the vehicle. The barriers 28 are suitably positioned, for example, at the entrances or exits of parking lots.

The barrier 28 includes a frame 29 having a base or bottom 30, which rests in the bottom of the recess 26 in the ground, a front wall 32, a rear wall 34 and side walls 36 and 38. A front rotatable mechanism, in the form of a roller 40 rotatably supported on an axle 42 which is carried by the side walls 36 and 38. The axle lies transversely relative to the normal path of movement of the vehicle and is preferably at right angles thereto. A horizontally extending platform 44 is supported stationarily by the side walls 36 and 38. The front end 46 of this platform terminates rearwardly of the roller 40, and the rear end terminates at 48.

A rear rotatable mechanism in the preferred form of a roller 50 is mounted for vertical movement relative to the platform 44 and is disposed rearwardly of the rear end 48 of the platform. In the embodiment illustrated, the supporting means for the rear roller 50 includes a frame 52, including two parallel and rearwardly extending arms 54 and 56 which are spaced from one another. The front ends of these arms are pivotally supported on the axle 42. Each of the rear ends of the arms is provided with upward extensions 58 which carry an axle 60 for supporting the roller 50.

Figure 6:
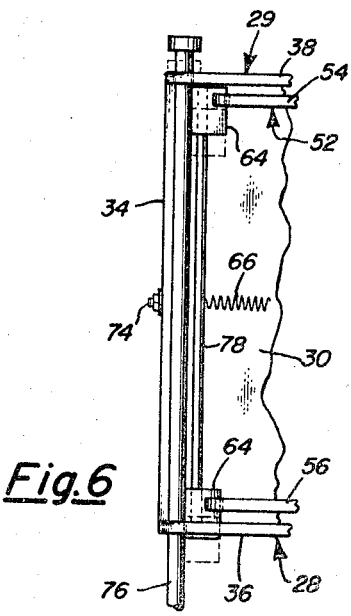
FIG. 6 is a fragmentary sectional view taken along line 6—6 of FIG. 5.

The extreme rear ends of the arms are notched forwardly, as at 62 for receiving latches 64 (see FIG. 6). When the frame 52 is locked in the position shown in FIG. 6, and the traction wheel of the vehicle rests on rollers 40 and 50, insufficient traction is had between the traction wheel and the platform for continuous forward movement of the vehicle.

The frame 52 is normally urged to its elevated position by a tension spring 66. The front end of this spring is connected to an arm 68 which is fixed to a rod 70, and this rod is carried by arms 72, which are formed integrally with and depend from the front portion of arms 54 of frame 52. The rear end of the spring 66 is fixed to the rear wall 34 of frame 29 by a hook 74. The upward movement of the rear of frame 52 and consequently the roller 50 is limited by the engagement of the arms 56 of the frame 52 with the underside of the rear end of platform 44. The latches 64 are carried by a rod 76, which is journaled for sliding movement in the side walls 36 and 38 of the frame 29.

The latches are slidably carried by shoulder 78 which limit downward, i.e., clockwise movement (as viewed in FIG. 4) of the latches. These stops or shoulders 78 are formed by the walls forming the slots in the frame side walls 36 and 38, and also function as supports, through the latches, for the weight imposed on the roller 50.

This rod can be actuated to latching position manually or by mechanical, hydraulic or electrical mechanism (not shown). Such mechanism can be responsive to and actuated by coin receiving mechanism, the latter being disposed so as to be accessible to the driver of the automobile 20. Thus, only after the proper coin is deposited by the driver, can the latching rod 76 move the latches 64 away from latching position.

When latches 64 are ineffective, then, sufficient traction, between the wheel 22 and the platform 44, is present for moving the vehicle forwardly, including also overcoming the slight resistance offered by the spring 66.

It is to be understood that the barrier would function effectively, if roller 40 was omitted. This roller, however, serves the purpose of eliminating substantially all traction between the traction wheel 22 and the platform, thus, eliminating all tendency of the wheel to move forwardly when the roller 50 is locked in its elevated position.

The ends 80 of the rollers 40 and 50 are conically shaped, i.e., flared outwardly to assist in guiding the wheel 22.

From the foregoing, it is apparent that by virtue of the present invention barrier can be manufactured and sold at a relatively low cost, since the structure is simple. The barrier provides an effective mechanism for controlling the entrance or exit to a parking lot.

In practicing the invention, suitable impediments are placed along the approaching path to the barrier, such as permanent small transversely disposed hills so spaced from one another that the driver must slow the speed of the vehicle to such extent that it cannot coast over the latched roller 50.

I claim:

1. A roller barrier for a vehicle having a traction wheel, said barrier comprising in combination:
   (A) rotatable mechanism;

(B) means for supporting the rotatable mechanism for vertical movement in the normal path of movement of the traction wheel;

(C) platform means disposed in the normal path of movement of and on the approach side of the rotatable mechanism; said supporting means and rotatable mechanism being movable downwardly and being biased upwardly to such level above the platform that the traction wheel, upon engaging the rotatable mechanism, while the wheel is moving approachwise, is lifted above the platform to such extent that the traction value, between the traction wheel and platform, is insufficient to provide for further approachwise movement of the traction wheel;

(D) means for locking the support means from vertical movement at the aforementioned level;

(E) and means for releasing the last mentioned means.

2. A roller barrier as defined in claim 1, characterized in that the rotatable mechanism is elongated and that the axis for the supporting means is disposed transversely of the direction of the normal forward path of movement of the traction wheel.

3. A roller barrier as defined in claim 1, characterized to include:

(F) a second rotatable mechanism disposed on the approach end of the platform means and adapted to cooperate with the first mentioned rotatable mechanism to provide a support for the traction wheel when the support means is locked in position.

4. A roller barrier as defined in claim 1, characterized to include.

(F) a spring normally biasing the support means upwardly to the aforementioned level.

5. A roller barrier as defined in claim 3, characterized in that the second mentioned rotatable mechanism is disposed at a lower level than the first mentioned rotatable mechanism.

6. A roller barrier as defined in claim 1, characterized in that the platform provides a means for limiting upward movement of the supporting means.

References Cited

UNITED STATES PATENTS 2,732,035    1/1956    Besoyan _____ 188—32 X
2,846,088    9/1958    Porter _____ 188—32 X MILTON BUCHLER, *Primary Examiner.*

T. W. BUCKMAN, *Assistant Examiner.*

PO-1050
(5/69)

UNITED STATES PATENT OFFICE
CERTIFICATE OF CORRECTION

Patent No. 3,447,639          Dated June 3, 1969

Inventor(s) Edward L. Parr

It is certified that error appears in the above-identified patent and that said Letters Patent are hereby corrected as shown below:

Column 1, line 29: "sufficient" should be --insufficient--.

SIGNED AND
SEALED

DEC 23 1969

(SEAL)
Attest:

Edward M. Fletcher, Jr.
Attesting Officer

WILLIAM E. SCHUYLER, JR.
Commissioner of Patents